US 6,191,684 B1

(12) United States Patent
Stadlbauer et al.

(10) Patent No.: US 6,191,684 B1
(45) Date of Patent: Feb. 20, 2001

(54) REMOTE SUPPLY CIRCUITRY

(75) Inventors: Günther Stadlbauer, Vienna; Robert Steininger, Lanzendorf, both of (AT)

(73) Assignee: Ericsson Austria AG, Vienna (AT)

( * ) Notice: Under 35 U.S.C. 154(b), the term of this patent shall be extended for 0 days.

(21) Appl. No.: 09/269,782

(22) PCT Filed: Oct. 2, 1997

(86) PCT No.: PCT/AT97/00211

§ 371 Date: Jun. 14, 1999

§ 102(e) Date: Jun. 14, 1999

(87) PCT Pub. No.: WO98/15110

PCT Pub. Date: Apr. 9, 1998

(30) Foreign Application Priority Data

Oct. 2, 1996 (AT) ...................................................... 1744/96
Sep. 26, 1997 (AT) ...................................................... 1643/97

(51) Int. Cl.$^7$ ................................. H04B 1/00; H04M 1/00
(52) U.S. Cl. ................... 340/310.01; 379/413; 379/418; 379/382
(58) Field of Search .......................... 340/310.01, 310.02, 340/310.03, 310.05; 379/413, 418, 382, 376, 377, 373, 399

(56) References Cited

U.S. PATENT DOCUMENTS 4,262,172 * 4/1981 Brolin .................................. 379/413
4,734,937 * 3/1988 Schmid ................................ 379/413

FOREIGN PATENT DOCUMENTS 0 178 993    4/1986  (EP) .

* cited by examiner

Primary Examiner—Donnie L. Crosland
(74) Attorney, Agent, or Firm—Burns, Doane, Swecker & Mathis, L.L.P.

(57) ABSTRACT

Remote supply circuitry for remotely supplying a subscriber connections in a communications system wherein subscribers can be connected to a central point via subscriber lines. Subscriber supply voltage or power supply is provided for each subscriber via a supply voltage source assigned to the subscriber and at least one supply isolating element wich is connected in series with the subscriber and associated subscriber line. The supply voltage source assigned to the subscriber supplies an output voltage which is controllable as a function of a measurable variable.

13 Claims, 5 Drawing Sheets

REMOTE SUPPLY CIRCUITRY

The invention relates to a circuit arrangement for remotely supplying a subscriber connection in a communications system, in particular a pair-gain system, having subscribers who can be connected via subscriber lines to a central point, for example a local section, with the supply voltage and current in each case being fed to the subscriber via at least one supply isolating element which is connected in series with the subscriber and the associated subscriber line, one connection of which at least one supply isolating element is connected to a supply voltage source assigned to the subscriber, while its other connection is connected to one wire in the subscriber line.

In known circuit arrangements of this type, the DC remote supply to the subscribers is produced by means of supply isolating elements which are provided, for example, in a local section of a remote equipment or of an exchange or the like, and which can typically be formed by resistors, inductances or current sources in order to provide a supply power level which is of the same magnitude irrespective of the distance to the subscriber, while ensuring, however, at the same time that the signal circuit and supply circuit are isolated.

The voltage drop across the supply isolating elements in conventional circuit arrangements is governed by the maximum voice level which is transmitted and can be received and by the maximum charge-pulse level. Since the charge pulses are transmitted only for a short time at specific intervals, the excess power in the supply isolating element in the remaining time intervals has to be dissipated via heat losses. Furthermore, the voice level is subject to different regulations in different countries, and the supply voltage is thus designed for the greatest of these levels, as a result of which additional power losses occur in countries with a low relative level in the circuit arrangements. This reduces the remote supply range, particularly for remotely supplied remote equipment.

A further disadvantage of the known circuit arrangements is that the amount of energy made available to each subscriber is that which allows the subscriber to still receive a regular supply when said subscriber is at the greatest possible range from the local section. The excess energy which remains for a subscriber who is located closer thus has to be destroyed, likewise in the local section, in the form of heat. In consequence, very large amounts of heat have to be dissipated in some cases, which, for example where there are a large number of subscribers in central exchanges, results in a cooling apparatus being set up which is used exclusively for this purpose. In this case, not only is energy wasted, but the necessity to constantly maintain the cooling results in a considerable cost.

The object of the invention is to avoid these disadvantages and to specify a circuit arrangement of the type mentioned initially which allows the heat losses to be reduced, as a result of which no cooling apparatus is required.

A further object of the invention is to achieve a high utilization level for the energy which is available for the subscriber supplies.

Furthermore, it is intended to allow an increase in the number of subscribers who can be supplied. A further aim of the invention is to achieve an increase in the supply range to individual subscribers.

This is achieved according to the invention by the output voltage of the supply voltage source being controllable.

The controllable output voltage of the supply voltage source allows the voltage drop across the supply isolating element to be reduced to the necessary extent as a function of a control variable via which the cause of the power losses occurring in the local sections can be identified and quantified.

A further embodiment of the invention provides for the supply voltage source to have a first control input, which is connected to the output of a control unit that produces analog or digital control signals as a function of the time profile and magnitude of the charge-pulse level and/or of the voice-signal level and/or of the maximum voice-signal level that occurs on the subscriber line.

Before the activation of a charge pulse, the output voltage of the supply voltage source, and thus the voltage drop across the supply isolating element, are increased via the first control input, and they are then reduced to the original value again after the charge pulse. With regard to the maximum voice-signal level which occurs on the subscriber line, the supply voltage can be matched via the control unit to the value agreed for a country or a region, or control can be carried out as a function of the time profile of the voice-signal level.

A development of the invention provides that the output voltage of the supply voltage source is increased or decreased in response to a rise or fall, respectively, in the control signals at one of its control inputs, preferably corresponding to a mathematical function, such that the harmonic component produced by the transition is below the lowest voice frequency that occurs on the subscriber line, preferably below 300 Hz.

This avoids any sudden transition from one voltage state to the other leading to the formation of interference frequencies which, superimposed on the voice signal, would be audible to the subscriber and would interfere with the course of the call.

According to another variant of the invention, it is possible to provide for the supply voltage source to have a second control input, which is connected to the output of a further control unit, the inputs of which further control unit pick up the voltage drop across the at least one supply isolating element, such that the output voltage of the supply voltage source is controllable as a function of the voltage drop that occurs across the supply isolating element.

This allows the power losses to be minimized by matching the supply voltage to the actually existing subscriber loop impedance, thus resulting both in optimization of the supply range for the number of subscribers and a reduction in the heat losses to be dissipated in the supply isolating elements. Greater individual subscriber ranges can thus be achieved, with the same total range.

A further feature of the invention may consist in that, in addition to the at least one supply isolating element, a further supply isolating element is provided, which is connected between the other subscriber line wire and ground.

Such a balanced supply is used to comply with national and international regulations and Standards. Furthermore, additional balancing circuits may be provided, which are not described in any more detail.

According to a further embodiment of the invention, it is possible to provide for the supply isolating element to be formed by a constant-current source, an inductance, an electronic inductor or a non-reactive resistor.

Both the constant-current source, the inductance, the electronic inductor and the non-reactive resistor allow the supply to be fed to the subscriber but, in the process, prevent any short circuit of the signal voltages transmitted on the subscriber line.

In a further embodiment of the invention, it possible to provide for the supply voltage source for supplying subscribers to be formed by a controllable switched-mode regulator. This allows any increase in the magnitude of the supply voltage to be controlled in a simple manner.

According to a further feature of the invention, the switched-mode regulator can be formed by an existing ringing-voltage generator in the local section.

In many implementations of local sections, each subscriber is assigned his or her own ringing-voltage generator, which includes a switched-mode regulator which can be used to produce the supply voltage, so that there is no need to provide a specific circuit for the subscriber.

In a further embodiment of the invention, it is possible to provide for the further control unit to be formed from a control amplifier, and for the output of the control amplifier to be connected to the second control input of the switched-mode regulator, such that the voltage drop across the two connections of the supply isolating element is kept constant by controlling the supply voltage source.

A control loop formed in such a way makes it possible to achieve a constant voltage drop across the at least one supply isolating element and thus to allow particularly low power losses in this element, irrespective of whether the respective subscriber line is very short or very long.

In a further embodiment of the invention, it is possible to provide for the ringing-voltage circuit and the remote supply circuit to be switched over by a controllable switch, for example a relay, in particular a line card access switch.

Although the ringing current can also be supplied to the subscriber via the at least one supply isolating element, isolation of the ringing-voltage circuit and supply circuit by means of a relay, for example, is advantageous in order to achieve a high ringing current.

The invention is explained in detail in the following text with reference to the exemplary embodiments which are illustrated in the drawings, in which.

Figure 5:
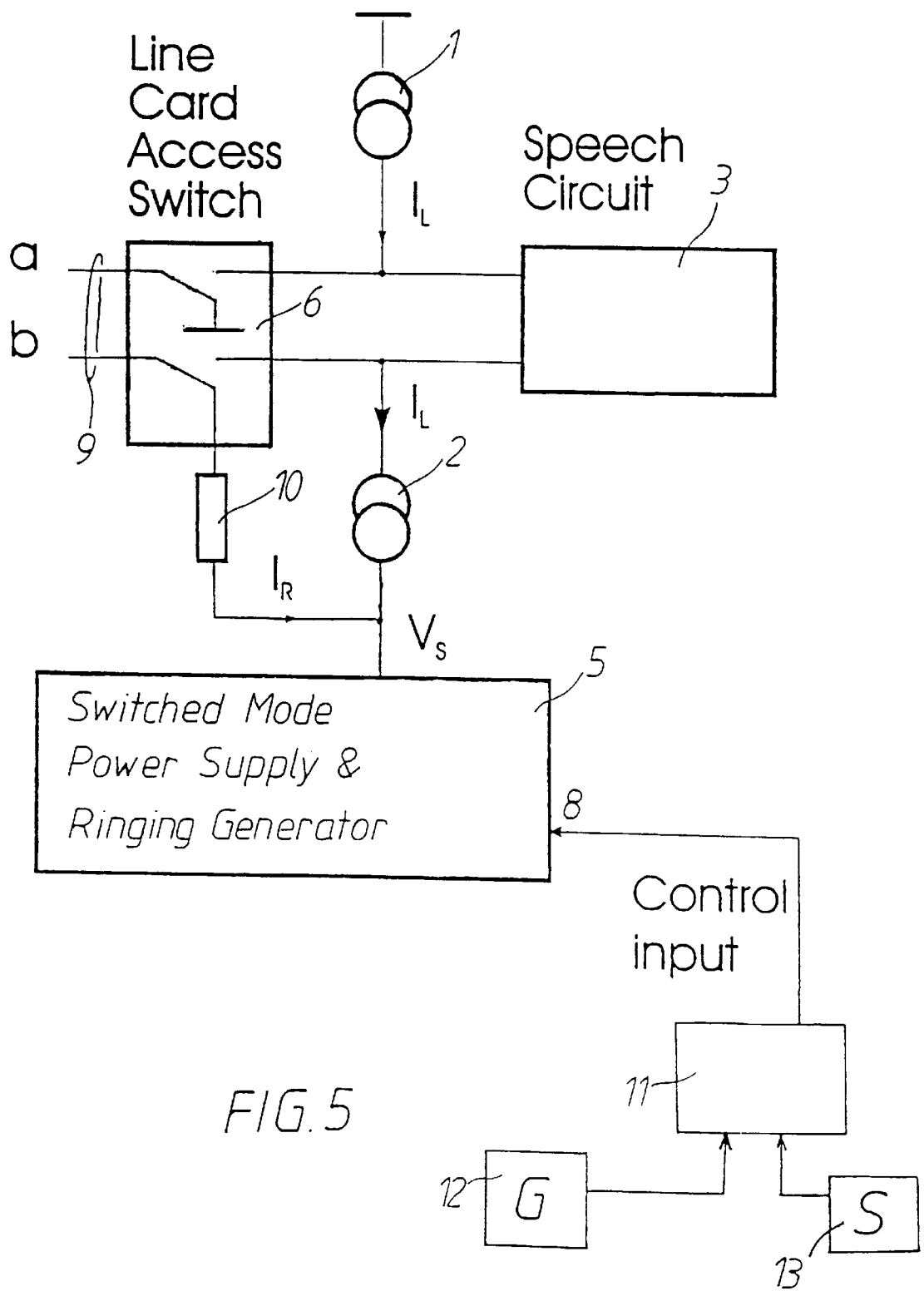
FIG. 5 shows a further embodiment of the circuit arrangement according to the invention.

FIG. 5 shows a circuit arrangement for remotely supplying a subscriber connection in a local section of a pair-gain system. However, the invention is not limited just to such systems but can be used for all communications systems in which a subscriber is supplied remotely. The subscriber, who is not illustrated and may be located at various distances from the local section, can be connected to the local section via a subscriber line 9 having wires a, b. According to the exemplary embodiment shown in FIG. 5, a ringing-voltage circuit having a ringing current $I_R$ and a remote-supply circuit having a supply current $I_L$ can be seen, which circuits are isolated and can be switched over via a line card access switch or relay 6.

In FIG. 5, a balanced supply, which is normal in telephone systems, is provided by two supply isolating elements which are designed as constant-current sources 1, 2 and which force a constant current $I_L$ to flow, coming from a supply voltage source 5 assigned to the subscriber, via the subscriber line a, b to ground when the switch 6 produces the corresponding link, which is actually interrupted in FIG. 5.

However, the constant current supply can just as well be provided via only one of the two supply isolating elements 1, 2.

The constant-current source 1, 2 is therefore a supply isolating element since, on the one hand, it feeds the supply to the subscriber and, on the other hand, it prevents the signals transmitted on the subscriber line 9 from being short-circuited via the supply voltage connections. Supply isolating elements may also be provided by a non-reactive resistor and/or an inductance, an electronic inductor or equivalent elements.

Figure 3:
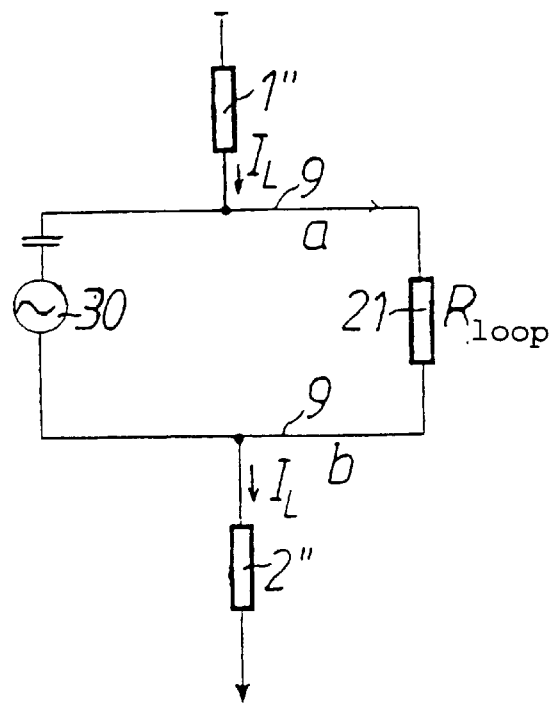
FIG. 3 shows an equivalent circuit of a circuit arrangement for remote supply.

In conventional systems, the current $I_L$ in the subscriber line a, b is kept constant by constant-current sources, or a resistor supply is used, as can be seen from the illustration in FIG. 3, from a supply voltage $V_S$ via a supply impedance 2" to the subscriber line 9 and, from this line, via a second supply impedance 1" to ground, irrespective of what the actual length of the subscriber line (a, b) 9 is, with the supply voltage $V_S$ generated in the voltage source 5 (FIG. 5) likewise being constant, thus producing a supply current $I_L$ via the loop resistance $R_{loop}$ formed from the line resistance and the subscriber terminal.

The required supply voltage $V_S$ is composed of the voltage drops across the supply isolating elements 1" and 2" and the voltage drop across the loop resistance $R_{loop}$, where $R_{loop}=R_{apparatus}+R_{line}$.

$$V_S=2 \cdot V_{ST}+I_L \cdot R_{loop}$$

Owing to the AC voice voltages which are transmitted on the subscriber line 9 and, in FIG. 3, are produced by an AC voltage source 30, it is also necessary to take account of the fact that the potential of the DC supply voltage can be modulated. The minimum required supply voltage is thus given by:

$$V_{ST}=V_G+V_{SE}+V_{SS}+V_O$$

where $V_G$ ... peak charge-pulse voltage $V_{SE}$ ... peak received voice-signal voltage $V_{SS}$ ... peak transmitted voice-signal voltage $V_O$ ... circuit-dependent voltage drop $V_G$ in exchanges is normally between 2.4 and 14 V (2 to 10 $V_{rms}$) and, in remote equipment, is between 0.7 and 1.4 V (0.5 to 1.0 $V_{rms}$).

The ITU-T standardized voice level is governed by the following definition:

Voice level [dBm]=Peak voice level [dBm]+Relative level [dBr]

While the peak voice level is defined to be 3.14 dBm (A-law voice coding) or 3.17 dBm ($\mu$-law voice coding), the relative level varies from country to country, for example −7 dBr.

For the latter value, $V_{SE}$ and $V_{SS}$ become:

$$V_{SE/SS}=1.4 \times 0.775 \times 10^{\text{voice level}/20}=1.4 \times 0.775 \times 10^{-3.86/20}=0.7 \ V$$

A relative level of 0 dBr would result in $V_{SE/SS}=1.27$ V. The voice level is thus significantly below the charge-pulse level.

According to the prior art, when the voice pulse level and the charge-pulse level are taken into account, the supply voltage $V_S$ on the subscriber line is chosen to be correspondingly higher for the design of the circuit arrangement, and is left constant at this value, in order that adequate supply reliability is provided for all possible operating situations. In consequence, in the pauses between the charge pulses or in countries where the maximum voice level is low, the voltage drop across the supply isolating element is increased, resulting in increased power losses on this element.

According to the invention, this is avoided by the output voltage $V_S$ of the supply voltage source 5 being controllable. In the exemplary embodiment according to FIG. 5, the supply voltage source 5 has a first control input 8 for this purpose, which is connected to the output of a control unit 11. The control unit 11 produces control signals as a function of the time profile and the magnitude of the charge-pulse level and/or of the voice-signal level and/or of the magnitude of the maximum voice-signal level occurring on the subscriber line, and these control signals are used to influence the output voltage $V_S$.

The information about the charge-pulse level and the voice-signal level is directly available in the local section for the control unit 11, which is indicated in FIG. 5 by the function blocks 12 and 13 which pass this information on to the control unit 11. The control input 8 can in this case be driven via an analog control voltage or a digital value and, for example, a serial or parallel bus interface or, for example, a pulse-width-controlled control signal can thus be provided, with respect to which there is no limitation. In principle, the control unit 11 operates such that, via the control input 8, it causes an increase in the supply voltage $V_S$ before the transmission of charge pulses, and a decrease in the supply voltage after the transmission of the charge pulses. This process can be understood directly from the voltage/time charts in FIG. 4. For simplicity, the charge pulses $V_G$ are shown only by their envelope curve in this illustration. The output voltage $V_S$ of the supply voltage source 5 is correspondingly increased from a value $V_{SO}$, which is present during the charge-pulse pauses, to a value $V_{S1}$, is maintained during the transmission of the charge pulses and, once they have ended, is reduced to the value $V_{SO}$ again.

If charge pulses for different subscribers arrive simultaneously and the energy balance of the system requires it, these charges pulses can be interleaved, for example by offsetting them in time or delaying them, so that no excessively large sudden load changes can occur.

For the significantly lower voice level, the output voltage $V_S$ of the supply voltage source 5 is preferably adapted by predetermining a setting in the unit 13 which corresponds to the national, maximum voice signal level. Alternatively, a control process can be provided which takes appropriate account of pauses in calls, during which the voice level falls to zero. Furthermore, as has already been indicated above, it is possible to adjust the supply voltage on the subscriber line as a function of the actually existing voice signal level, possibly plus a small safety margin. This has the disadvantage that, if fast sudden level changes occur (which are intrinsically unusual in voice transmission), voice distortion occurs for a short time interval in the millisecond range, before the supply voltage is correctly stabilized. If a data transmission by means of a modem is identified, a change is made to the maximum voice level once the identification tone has been identified.

This allows the power losses on the supply isolating element to be kept low during the charge-pulse pauses and corresponding to the various relative voice levels.

In FIG. 5, the controllable supply voltage source 5 is formed by a switched-mode regulator. Since a ringing-voltage generator 5 may include such a switched-mode regulator, it is particularly advantageous if the latter is also used for the purpose of allowing the supply voltage $V_S$ to be controlled.

For the exemplary embodiment according to FIG. 5, this means that, when the line card access switch 6 is in the switch position shown, the switched-mode regulator 5 produces the ringing voltage across a resistor 10 while, when the controllable switch 6 is in the other position (which switch can also be provided by a simple relay) it forms the supply voltage $V_S$ for the current sources 1, 2, controlled via a control input 7.

In order to avoid causing audible interference noise, the output voltage $V_S$ of the supply voltage source 5 is increased or decreased in response to a rise or fall, respectively, in a control signal at one of the control inputs 7, 8 of this source, preferably in accordance with a mathematical function, such that the harmonic component produced by the transition is below the lowest voice frequency that occurs on the subscriber line, preferably below 300 Hz.

Figure 4:
FIG. 4 shows a voltage/time chart for the supply voltage and the charge pulses.
Figure 4:
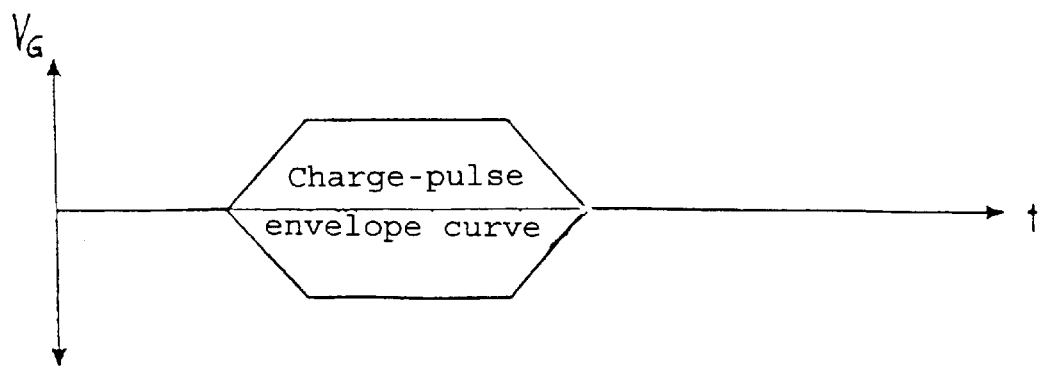

In FIG. 4, a linear transition of the output voltage $V_S$ is provided, although the transition can also be provided by a part of a sinusoidal function, preferably from one peak value to the next, by which means the harmonic component can be kept low.

A further power loss problem in known circuit arrangements for remote supply results from the different lengths of the subscriber lines 9 to the subscribers, since the output voltage $V_S$ of the supply voltage source 5 is designed for the longest subscriber line lengths.

This means that, if the subscriber lines 9 are very short, the current sources 1, 2 have to cope with an increased voltage drop and thus greater power losses. In devices for a large number of subscribers and together with other remote supply circuit arrangements, these power losses can rise to such an extent that dedicated cooling systems are required for this purpose.

Figure 6:
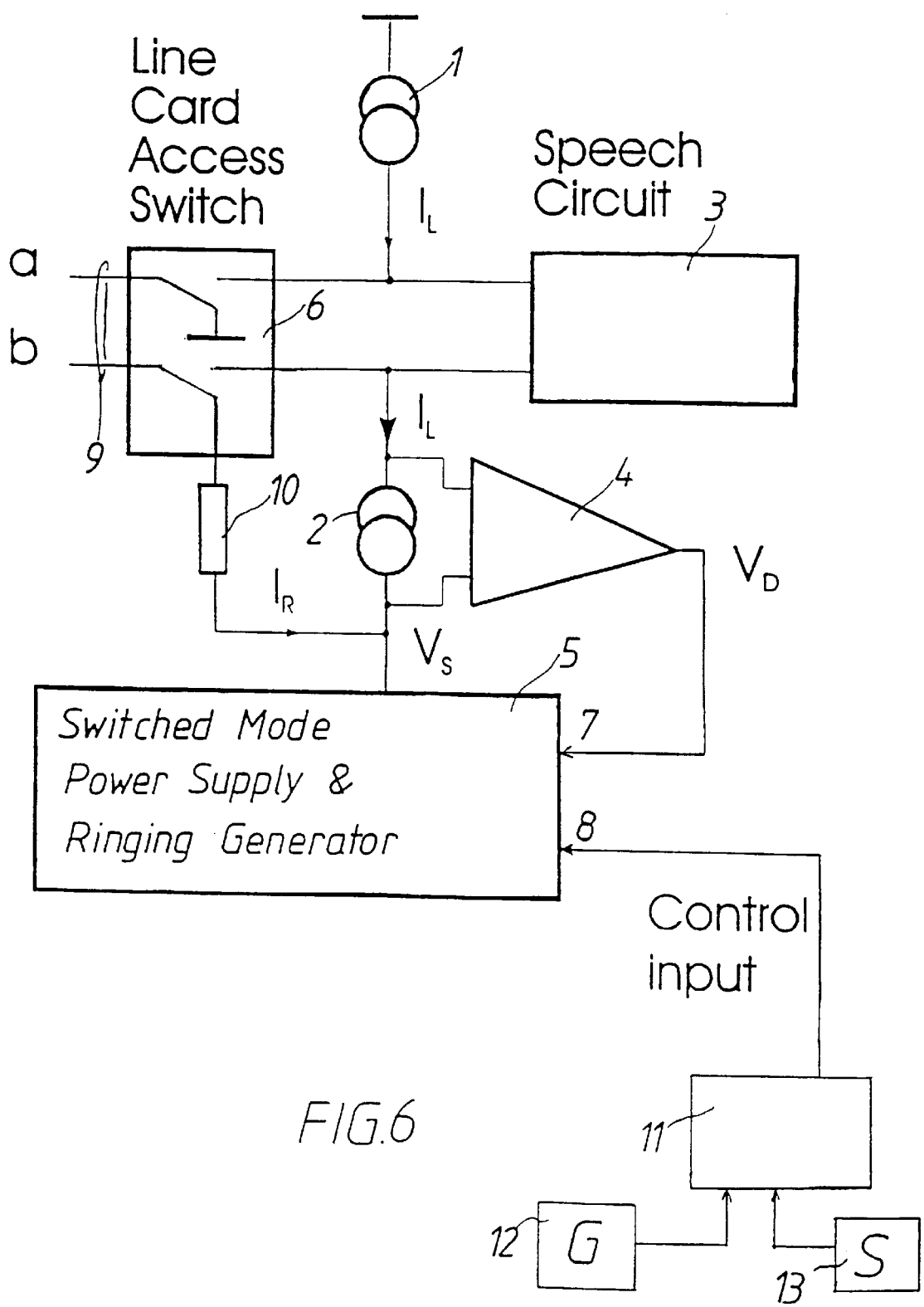
FIG. 6 shows a further embodiment of the circuit arrangement according to the invention.

The embodiment of the circuit arrangement according to the invention shown in FIG. 6 solves this problem by means of a second control input 7 for the supply voltage source 5, which input is connected to the output of a further control unit 4, the inputs of which further control unit 4 pick up the voltage drop across the supply isolating element, which is designed as a constant-current source 2, such that the output voltage of the supply voltage source 5 is controllable as a function of the voltage drop that occurs across the supply isolating element 2.

Alternatively, the voltage drop across the two constant-current sources 1, 2 or across the constant-current source 1 could also be used for this purpose.

The power losses can thus be kept very low irrespective of the length of the present subscriber line.

In the exemplary embodiment according to FIG. 6, the further control unit is formed by a control amplifier, whose inputs pick up the voltage drop across the constant-current source 2 and whose output is connected to the control input 7 of the switched-mode regulator 5, such that this control loop always keeps the voltage across the two connections of the constant-current source 2 constant, by controlling the supply voltage source 5. Thus, if the voltage drop across the current source 2 becomes greater owing to a short subscriber line 9, then a voltage $V_{D\,i}$s applied to the control input 7 such that the supply voltage $V_S$ is reduced, with the current $I_L$ continuing to remain constant but with the voltage drop across the current source 2 being reduced, so that the power losses are not increased and no excess energy is wasted.

This consideration of the length of the individual subscriber lines by adaptation of the supply voltage via the second input 7 is superimposed on the adaptation to the currently existing call-signal and charge-pulse level values via the first input 8.

As has already been mentioned above, instead of the constant-current sources 1 and 2, other equivalent apparatuses for supply purposes can also be provided, such as non-reactive resistors, inductances, electronic inductors or the like.

Figure 1:
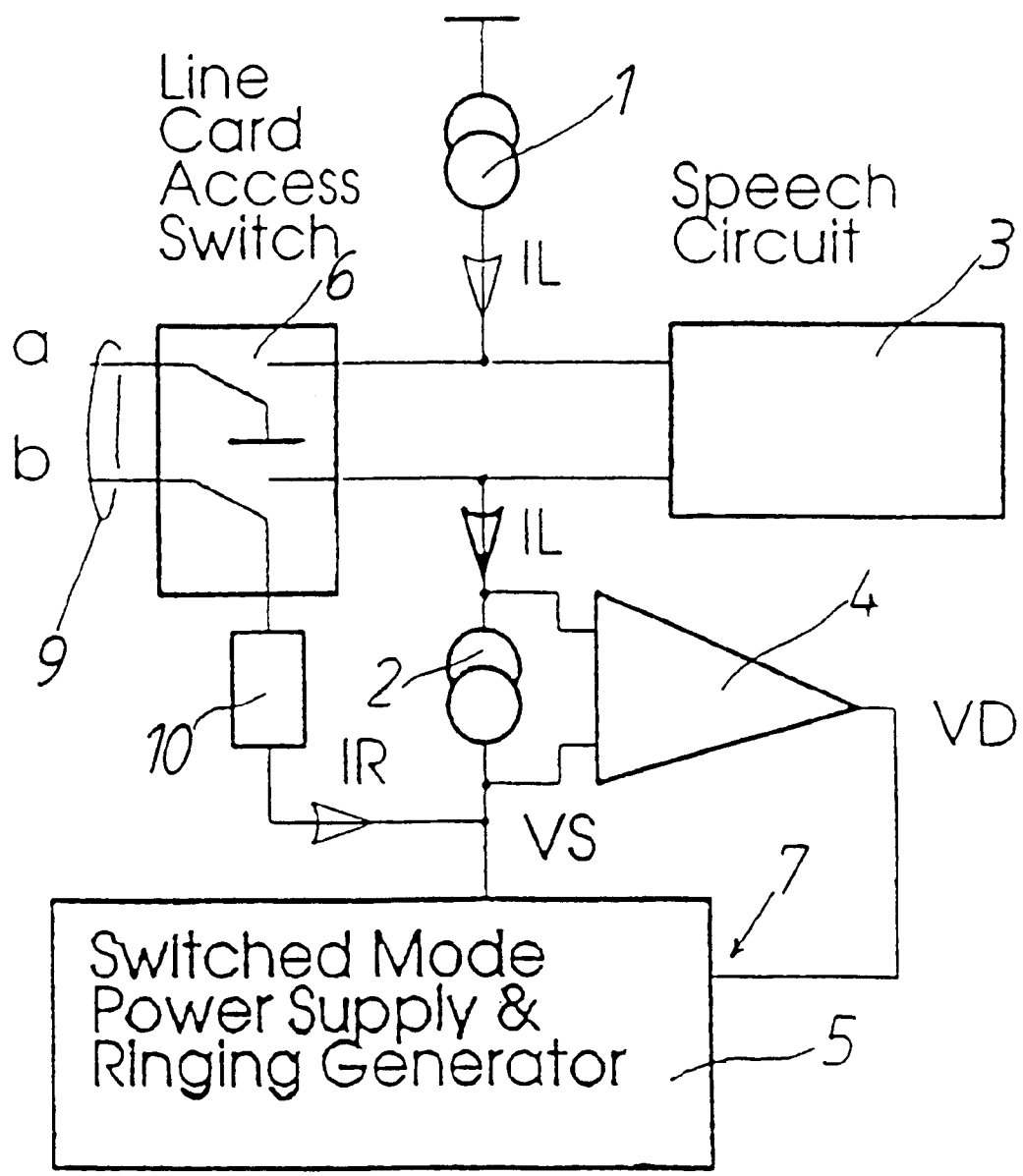
FIG. 1 shows an embodiment of the circuit arrangement according to the invention.
Figure 2:
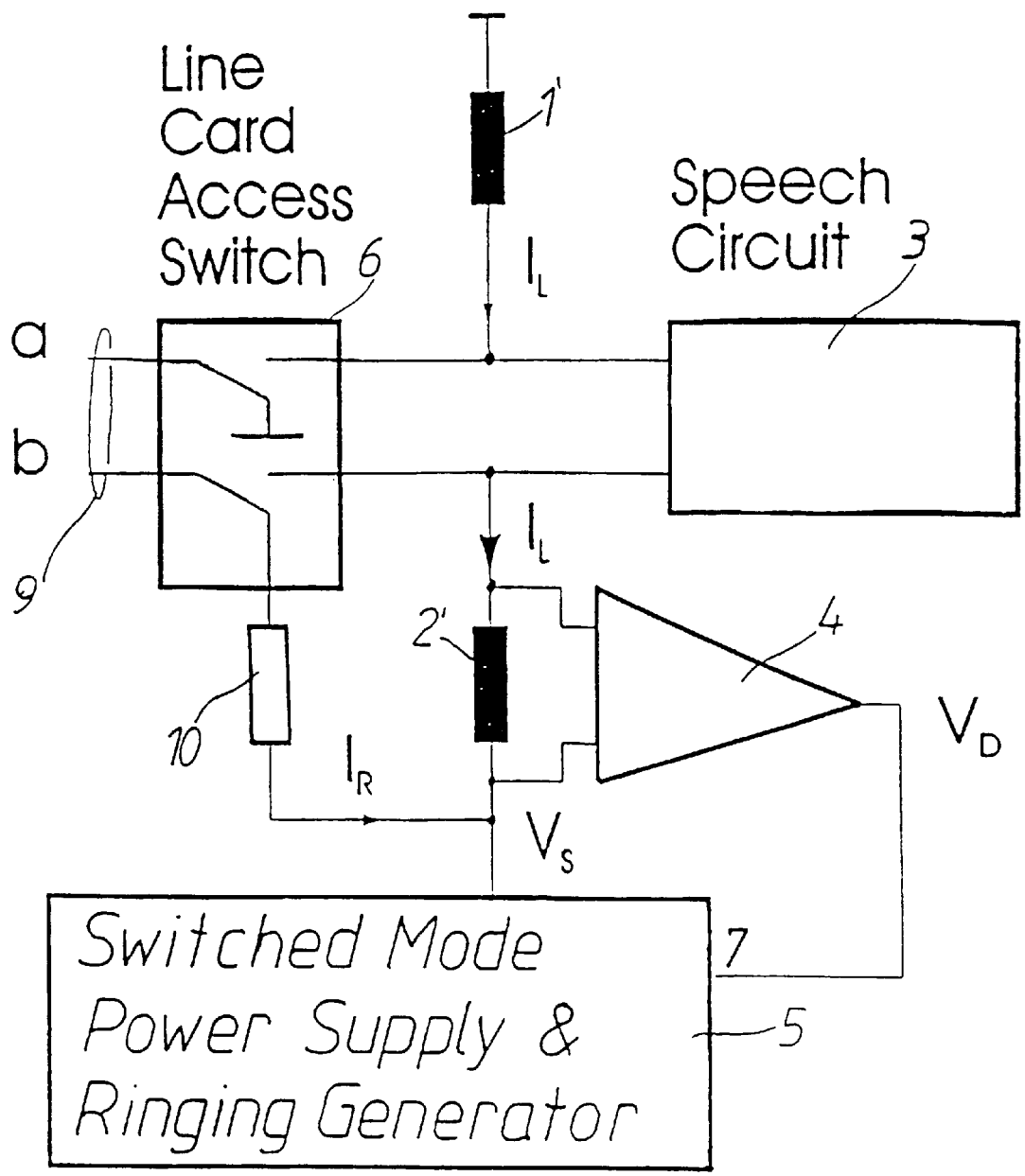
FIG. 2 shows a further embodiment of the circuit arrangement according to the invention.

To this end, FIGS. 1 and 2 show exemplary embodiments in which the first control input 8 has been completely omitted. In this simplified embodiment, the output voltage $V_S$ is controlled only via the second control input 7, so that this voltage is varied only as a function of the particular subscriber line length in this case. These measures on their own allow a significant reduction to be achieved in the power losses incurred.

The two connections of the constant-current source 2 are connected to the control amplifier 4, whose output is connected to the second control input 7 of the switched-mode regulator 5, so that this control loop always keeps the voltage across the two connections of the constant-current source 2 constant by controlling the supply voltage source 5. Thus, if the voltage drop across the current source 2 becomes greater owing to a short subscriber line 9, then a voltage $V_D$ is applied to the control input 7 such that the supply voltage $V_S$ is reduced.

In the exemplary embodiment according to FIG. 2, the supply isolating element is formed by an inductance 1' and 2', in which case the voltage drop produced by the pulsed supply voltage $V_S$ can be picked up at the ends of the inductance 2', and is further amplified via the control amplifier 4, which drives the switched-mode regulator 5 in order to regulate the supply voltage $V_S$. As has already been mentioned above, the inductances 1' and 2' may also be replaced by electronic inductors, in a development of the invention.

What is claimed is:

1. A circuit arrangement for remotely supplying a subscriber connection in a communications system wherein a subscriber can be connected to a central point via a subscriber line (9), having a tip line (a) and a ring line (b) to a central point, the circuit arrangement comprising:

a supply voltage source (5) assigned to the subscriber;

at least one supply isolating element, wherein said at least one supply isolating element is connected in series with the subscriber and the associated subscriber line, one connection of said at least one supply isolating element being connected to the supply voltage source (5) assigned to the subscriber, the other connection being connected to one wire (b) of the subscriber line (9); and wherein the supply voltage source (5) assigned to the subscriber supplies an output voltage (Vs) which is controllable as a function of a measurable variable, said measurable variable being proportional to the power loss at the central point.

2. The circuit arrangement as claimed in claim 1 further comprising:

a first control unit (11) having an output (8) that produces analog or digital control signals as a function of a time profile and magnitude of a charge-pulse level and/or of a voice-signal level and/or of a maximum voice-signal level that occurs on the subscriber line, wherein the measurable variable which is proportional to the power loss at the central point is formed by the charge-pulse level and/or the voice-signal level; and wherein the supply voltage source (5) has a first control input (8), which is connected to the output of the control unit (11).

3. The circuit arrangement as claimed in claim 2, wherein the output voltage of the supply voltage source (5) is increased or decreased in response to a rise or fall, respectively, in the control signals at the first control input (8), in accordance with a mathematical function, such that the harmonic component produced by the transition is below the lowest voice frequency that occurs on the subscriber line.

4. The circuit arrangement as claimed in claim 1 further comprising:

a second control unit (4) having two inputs and one output, wherein the inputs of said second control unit (4) pick up the voltage drop across the at least one supply isolating element (2), such that the output voltage of the supply voltage source (5) is controllable as a function of the voltage drop that occurs across the supply isolating element (2); and wherein the measurable variable which is proportional to the power losses at the central point is formed by the voltage drop that occurs across the supply isolating element (2) and the supply voltage source (5) has a second control input (7), which is connected to the output of said second control unit (4).

5. The circuit arrangement as claimed in claim 4, wherein, in addition to the at least one supply isolating element (2), a further supply isolating element (1) is provided, which is connected between the other subscriber line wire (a) and ground.

6. The circuit arrangement as claimed in claim 4, wherein the supply isolating element (2) is formed by one of a constant-current source (1, 2), an inductance (1', 2'), an electronic inductor or a non-reactive resistor (1", 2").

7. The circuit arrangement as claimed in claim 1, wherein the supply voltage source (5) is formed by a controllable switched-mode regulator.

8. The circuit arrangement as claimed in claim 7, wherein the switched-mode regulator is formed by an existing ringing-voltage generator (5).

9. The circuit arrangement as claimed in claim 4, wherein said second control unit (4) is formed from a control amplifier, and wherein the output of the control amplifier (4) is connected to the second control input (7) of the switched-mode regulator (5), such that the voltage drop across the supply isolating element (2, 2') is kept constant by controlling the supply voltage source (5).

10. The circuit arrangement as claimed in claim 8, wherein the ringing-voltage generator and the supply voltage source (5) can be switched over by a controllable switch.

11. The circuit arrangement as claimed in claim 10, wherein the controllable switch is a relay.

12. The circuit arrangement as claimed in claim 10, wherein the controllable switch is a line card access switch (6).

13. The circuit arrangement as claimed in claim 3, wherein the harmonic component produced by the transition is below 300 Hz.

* * * * *